US 6,572,828 B1

(12) United States Patent
Potyrailo et al.

(10) Patent No.: US 6,572,828 B1
(45) Date of Patent: Jun. 3, 2003

(54) METHOD AND APPARATUS FOR HIGH-THROUGHPUT CHEMICAL SCREENING

(75) Inventors: Radislav Alexandrovich Potyrailo, Niskayuna, NY (US); John Patrick Lemmon, Delanson, NY (US); William Patrick Flanagan, Rexford, NY (US); Roger Neal Johnson, Hagaman, NY (US)

(73) Assignee: General Electric Company, Schenectady, NY (US)

( * ) Notice: Subject to any disclaimer, the term of this patent is extended or adjusted under 35 U.S.C. 154(b) by 252 days.

(21) Appl. No.: 09/610,001

(22) Filed: Jul. 3, 2000

Related U.S. Application Data
(60) Provisional application No. 60/144,566, filed on Jul. 16, 1999.

(51) Int. Cl.[7] .................................. B01J 19/00
(52) U.S. Cl. ................ 422/130; 422/82.05; 422/82.08; 422/99; 422/129; 422/131; 436/164; 436/165; 436/172
(58) Field of Search .................... 422/63, 65, 82.05, 422/99, 101, 102, 129, 130, 131, 138; 436/37, 164, 172, 174

(56) References Cited

U.S. PATENT DOCUMENTS

| | | | | |
|---|---|---|---|---|
| 4,950,608 A | * | 8/1990 | Kishimoto | .................. 435/290 |
| 5,216,488 A | * | 6/1993 | Tuunanen et al. | ........... 356/440 |
| 5,307,144 A | * | 4/1994 | Hiroshi et al. | ............... 356/244 |
| 5,446,263 A | * | 8/1995 | Eigen et al. | ................. 219/521 |
| 5,489,532 A | * | 2/1996 | Charm et al. | ............. 435/286.1 |
| 5,534,328 A | | 7/1996 | Ashmead et al. | |
| 5,753,187 A | | 5/1998 | Reynolds et al. | |
| 5,776,359 A | | 7/1998 | Schultz et al. | |
| 5,785,927 A | | 7/1998 | Scott et al. | |
| 5,792,431 A | | 8/1998 | Moore et al. | |
| 5,819,842 A | * | 10/1998 | Potter et al. | ................. 165/206 |
| 5,843,385 A | | 12/1998 | Dugan | |
| 5,872,623 A | * | 2/1999 | Stabile et al. | .................. 356/73 |
| 5,959,297 A | * | 9/1999 | Weinberg et al. | ............ 250/288 |
| 5,980,704 A | | 11/1999 | Cherukuri | |
| 5,985,356 A | | 11/1999 | Schultz | |
| 6,004,617 A | | 12/1999 | Schultz et al. | |
| 6,027,695 A | | 2/2000 | Oldenburg et al. | |
| 6,030,917 A | * | 2/2000 | Weinberg et al. | ........... 502/104 |
| 6,044,212 A | | 3/2000 | Flavin et al. | |
| 6,045,671 A | | 4/2000 | Wu et al. | |
| 6,045,755 A | | 4/2000 | Lebl et al. | |
| 6,149,869 A | * | 11/2000 | Antonenko et al. | ........... 422/99 |
| 6,238,627 B1 | * | 5/2001 | McGowan et al. | ......... 422/130 |
| 6,436,351 B1 | * | 8/2002 | Gubernator et al. | ........ 422/102 |

FOREIGN PATENT DOCUMENTS

| | | |
|---|---|---|
| WO | WO 98/07026 | 2/1998 |
| WO | WO 98/17391 | 4/1998 |
| WO | WO 98/57181 | 12/1998 |
| WO | WO 99/24834 | 5/1999 |
| WO | WO 99/56877 | 11/1999 |
| WO | WO 99/64158 | 12/1999 |
| WO | WO 99/64160 | 12/1999 |
| WO | WO 99/67024 | 12/1999 |
| WO | WO 00/09255 | 2/2000 |
| WO | WO 00/14529 | 3/2000 |
| WO | WO 00/17413 | 3/2000 |

* cited by examiner

*Primary Examiner*—Jill Warden
*Assistant Examiner*—Dwayne K. Handy
(74) *Attorney, Agent, or Firm*—Jeffrey S. Bernard; Dougherty, Clements & Hofer

(57) ABSTRACT

The present invention is directed to a method and apparatus for rapid screening of potential reactants, catalysts, or associated process conditions. In one embodiment, the method includes the steps of providing a reaction substrate having at least one substrate reservoir and introducing a reactant system at least partially embodied in a liquid into the substrate reservoirs. The reactant system is heated to at least one predetermined temperature. A flow of inert gas is provided through a manifold above the substrate reservoir. The reaction in the substrate reservoir can be monitored, e.g., visually or spectrophotometrically during the course of the reaction, or the reaction substrate block can be rapidly cooled to stop the reaction in the substrate reservoir prior to analysis.

21 Claims, 12 Drawing Sheets ations.

METHOD AND APPARATUS FOR HIGH-THROUGHPUT CHEMICAL SCREENING

CROSS REFERENCE TO RELATED APPLICATIONS

This application claims priority to and the benefit of the filing date of U.S. Provisional application No. 60/144,566 filed Jul. 16, 1999 and entitled METHOD AND APPARATUS FOR HIGH-THROUGHPUT CHEMICAL SCREENING, which is incorporated herein by reference in its entirety.

BACKGROUND

1. Field of the Invention

The present invention is directed to a method and an apparatus for rapid screening of potential reactants, catalysts, or associated process conditions and more specifically, to methods and apparatuses for rapid combinatorial screening of potential reactants and catalysts in thin film melt polymerization reactions.

2. Discussion of Related Art

Since its introduction in 1970, combinatorial chemistry has become a popular research tool among scientists in many fields. Combinatorial screening for biological activity has been prevalent in the pharmaceutical industry for nearly twenty years and, more recently, combinatorial screening for improved catalysts for the bulk chemical industries has enjoyed increasing popularity.

There has been, however, a lag in the development of combinatorial screening for production scale reactions. One reason has been the difficulty in emulating large-scale reactions at the micro-scale typically necessary for combinatorial work. In particular, special problems can arise for reactions that are significantly dependent on mass transport rates or flow configuration. For example, removal of inhibitory by-products formed during melt polymerization may require substantial phase transfer or volatilization, both of which are difficult to reproduce on a small scale.

Furthermore, most combinatorial work to date has focused on "solid phase" reactions. It is known that a wide variety of organic reactions can be carried out on substrates immobilized on resins. However, a substantial number of production scale reactions are "liquid phase" or "mixed phase," and are typically carried out in continuous flow reactor systems.

Finally, many combinatorial systems are highly complex and therefore may require significant effort and expense to be optimized for individual experiments. For many applications, it would be preferable to have a simple, compact system which would be suitable for bench-top experiments and yet enable high-throughput chemical screening utilizing a variety of reaction formats.

Early efforts in combinatorial screening of liquid phase reactions have focused on catalyst screening. Before the application of the combinatorial approach, catalyst testing was traditionally accomplished in bench scale or larger pilot plants in which feed to a continuous flow reactor was contacted with a catalyst under near steady state reaction conditions. This type of test system can be difficult to reproduce at the micro-scale typically required for combinatorial chemistry. Rapid combinatorial screening of reactants, catalysts, and associated process conditions typically requires that a large number of reactions or catalytic systems be tested simultaneously, while still providing a meaningful correlation between test results and eventual performance in a production-scale reactor.

As the demand for bulk chemicals has continued to grow, new and improved methods of producing more product with existing resources are needed to supply the market. However, the identities of additional effective reactants and catalyst systems for these processes continue to elude the industry. What are needed are new and improved methods and devices suitable for rapid screening of potential reactants, catalysts, and associated process conditions.

SUMMARY OF THE INVENTION

Accordingly The present invention is directed to methods and apparatus for rapid screening of potential reactants, catalysts, and associated process conditions. In one aspect, an exemplary embodiment of an apparatus of the present invention comprises a heating unit, a reaction substrate comprising at least one substrate reservoir, and a gas manifold to provide a flow of gas over the substrate reservoir. The apparatus may allow for real-time monitoring of the reaction.

In another aspect, an exemplary embodiment of a method of the present invention comprises the steps of providing a plurality of substrate reservoirs and introducing a reactant system at least partially embodied in a liquid into each substrate reservoir. The reactant system is rapidly heated to, and maintained at, at least one elevated temperature. A flow of inert gas is provided through a manifold above the substrate reservoirs. The reaction can be monitored in "real time" or rapidly cooled to stop the reaction prior to analysis.

BRIEF DESCRIPTION OF THE DRAWINGS

Various features, aspects, and advantages of the present invention will become more apparent with reference to the following description, appended claims, and accompanying drawings, wherein:

DETAILED DESCRIPTION OF PREFERRED EMBODIMENTS

Figure 1:
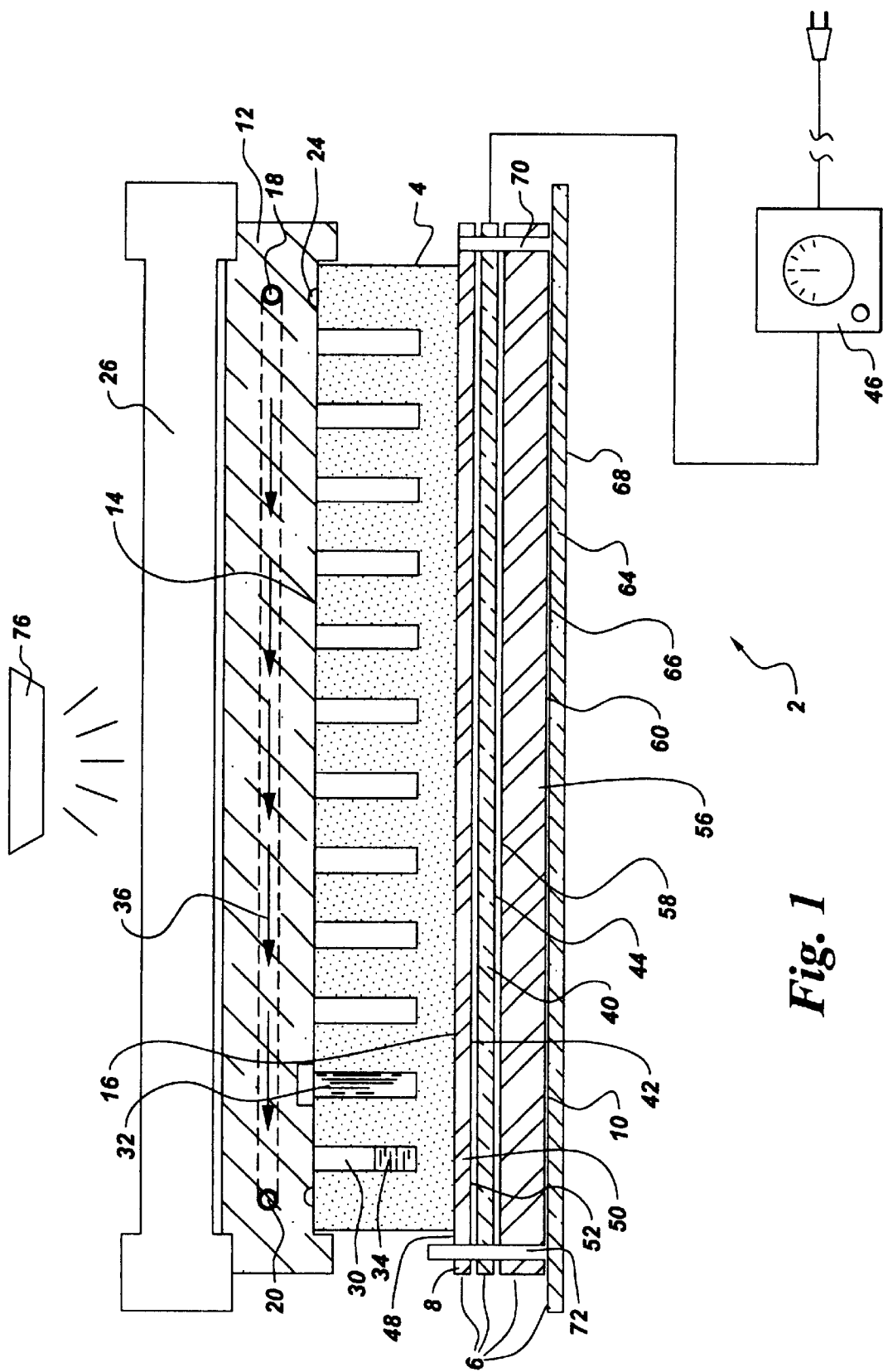
FIG. 1 is a side view of an aspect of an embodiment of the present invention.

Terms used herein are employed in their accepted sense or are defined. In this context, the present invention is directed to a method and apparatus for high-throughput chemical screening.

In one embodiment, the invention relates to a design of an array of melt polymerization reactors. For example, the formation of Fries rearrangement products (products formed by conversion of phenoic esters into corresponding ortho and par hydroxyketones) leads to differences in physical properties (flow and ductility) among polycarbonate materials produced by melt polymerization and more traditional interfacial processes. Thus, an adequate catalyst is needed which will provide reduced Fries formation for a desired molecular weight of the melt polycarbonate.

The need to evaluate variable concentrations of a single catalyst as well as various combinations of catalysts can dramatically add to the number catalytic materials that require testing. For example, the number of potentially useful compounds which can catalyze melt polymerization reactions is approximately $10^4$. Discovery of adequate catalysts for melt polymerization processes can be accelerated by using combinatorial chemistry, as has been demonstrated in other systems.

One difficulty in applying combinatorial chemistry to polymerization chemistry is the need to reproduce flow configuration and mass transport kinetics required for large scale production. For example, an attractive method of polycarbonate synthesis is the "melt" process, a technique which does not employ large volumes of solvents or phosgene. Melt polymerization typically involves transesterification of a carbonate diester (e.g., diphenylcarbonate) with a dihydroxy compound (e.g., bisphenol-A). Thus, melt polymerization reactions often require removal of inhibitory by-products, such as phenol, which are produced during polymerization. As polymerization progresses, the increasing viscosity of the reaction can make removal of such by-products increasingly difficult. Although vigorous mixing and volatilization are employed to remove phenol in large-scale reactors, this can be difficult to reproduce at the scale required for combinatorial chemistry.

The method and apparatus of the present invention is generally useful for conducting simultaneous melt polymerization processes in small-scale reactors. The apparatus of the invention employs a compact, modular format which can be optimized depending upon the requirements of the reaction being studied. In addition, a preferred embodiment of the invention is directed to a polymerization reactor array with capabilities for real-time monitoring of reaction progress, which increases the throughput of chemical screening.

The method of the invention can generally be useful for combinatorial screening of liquid phase polymerization. In a preferred embodiment, multiple small scale reactions are assembled whereby reagents are distributed over a large surface area such that a thin layer of polymer is produced in the reaction vessel. Such thin layer polymerization enhances phase transfer, thus enabling removal of inhibitory by-products, such as phenol, by volatilization using a stream of inert gas. Suitable examples of such reactions include the reaction of bisphenol A (BPA) and diphenyl carbonate (DPC) to form bisphenol A polycarbonate. Furthermore, it is contemplated that the present invention can be used to evaluate other melt polymerization systems, such as the formation of polyetherimide and poly(butyl)terepthalate.

In one embodiment, an aspect of the present invention is an apparatus comprising a heating unit, a reaction substrate comprising at least one substrate reservoir, and a manifold covering the substrate reservoir and providing a flow of gas over the substrate reservoir. Reactants may be provided as a thin film to enable volatilization of reaction by-products by the gas flow. Monitoring of product formation during the reaction can be accomplished by observing fluorescence through a window in the manifold or through apertures aligned with each substrate reservoir. The substrate reservoir may comprise a single unit or multiple units presented as, for example, microtiter plates or a plurality of individual tubes. Suitable heating units include, but are not limited to, a high power-to-mass heater positioned on an insulating block. Additionally, the heating unit may comprise a heat distribution plate to facilitate transfer of heat from the heater to the substrate reservoir, and a base plate to align individual components of the assembly.

Referring now to FIG. 1, an embodiment of a reactor system 2 for conducting high-throughput chemical screening comprises a reaction substrate 4 comprising at least one substrate reservoir 30 and thermally controlled by a heating unit 6 comprising an upper surface 8 and a lower surface 10. A gas manifold 12 covers upper surface 14 of reaction substrate 4 to form a headspace. Heating unit 6 is preferably positioned adjacent to lower surface 16 of reaction substrate 4.

In one embodiment, gas manifold 12 comprises ports 18 and 20 which allow gas 36 to flow across substrate reservoir 30 thereby substantially removing any volatile byproducts, as for example phenol, that may diffuse out of the polymerization melt. In the embodiment shown, gas 36 enters by inlet port 18, flows across reaction substrate 4 and exits at outlet port 20. Preferably, the gas employed is any gas, such as nitrogen, which is inert to the reaction. Gas manifold 12 can be made of any material, for example stainless steel or glass, which is stable to the chemistry of the reaction. Preferably, gas manifold 12 comprises a gasket 24 positioned between reaction substrate 4 and manifold 12 which functions to cushion manifold 12 and provide a seal between reaction substrate 4 and manifold 12. Gasket 24 is made of materials which are resistant to high heat and reaction products. Suitable materials include GARLOCK™ 3000 series gaskets (available from several commercial suppliers) and Linger Sil C-4401 material (available from Richard Klinger, Inc., Sidney Ohio).

Figure 2:
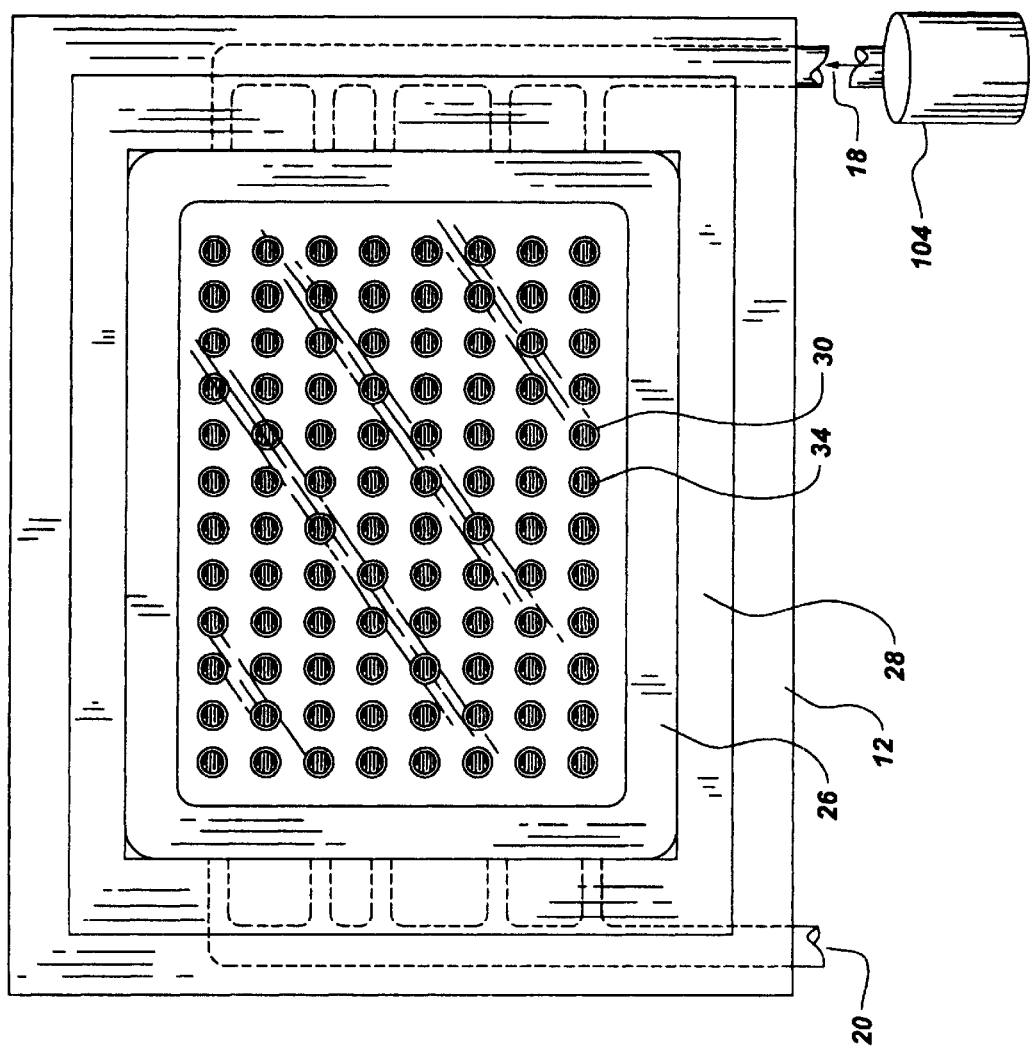
FIG. 2 is a top view of an aspect of an embodiment of the present invention.

Referring now to FIG. 2, in a preferred embodiment, a glass cover 26 on top of the gas manifold 12 allows for visual observation of the reaction. In a preferred embodiment of the invention, a deadweight 28 is placed on top of gas manifold 12. Deadweight 28 functions to maximize heat transfer between heating unit 6, and reaction substrate 4 and to compress high-temperature gasket 24. Deadweight 28 can be made of a material such as brass. It is anticipated that, in an exemplary embodiment, manifold 12 can be heated to prevent condensation of gas 36.

Referring to back to FIG. 1, in one embodiment of the invention, reaction substrate 4 is a block having a plurality of discrete substrate reservoirs 30 adapted to receive reactants 34. Preferably, the reaction substrate 4 is made of borosilicate glass, fused quartz, or any material which is stable to the chemistry of the reaction. In one embodiment, substrate reservoirs 30 are in the shape of a partial sphere or cylinder and sized to allow for starting reaction components to be placed into or prepared in the wells prior to initiation of the reaction. More preferably, the reaction substrate is a 96-well microtiter plate or similar block. In another embodiment of the invention, individual tubes 32 are inserted into substrate reservoir 30.

In one embodiment of the invention, heating unit 6 comprises a high-power-to-mass ratio heater 40, as for example a Mica strip or thin foil heater (Watlow Electric Manufacturing Co., St. Louis, Mo.). Preferably, heater 40 is controlled by a multiple setpoint temperature controller 46 which allows the temperature of reaction substrate 4 to be rapidly ramped to various setpoints and held at each setpoint as desired. For example, in a typical embodiment, heater 40 ramps at a rate of at least 10° C. per minute and reactor components consistently accommodate temperatures up to 400° C.

In the embodiment shown in FIG. 1, heating unit 6 also includes a heat distribution plate 48. Preferably, heat distribution plate 48 distributes the heat from heater 40 evenly across reaction substrate 4. In this embodiment, heat distribution plate is positioned such that lower surface 52 of heat distribution plate 48 is adjacent to upper surface 42 of heater 40 and the upper surface 50 of distribution plate 48 is adjacent to reaction substrate 4. Preferably, heat distribution plate 48 comprises a thermally conductive material such as aluminum or copper.

One embodiment of the invention contemplates the capability for creating a temperature gradient among different reactor subsets of the array. The temperature gradient can be established using a single heating unit 6 operating for the whole reactor array which comprises a specially designed heat distribution plate 48. For example, to produce a temperature gradient, heat distribution plate 48 can be formed as a wedge or comprise regions of different thermal conductivity. Alternatively, individual heaters can be arranged for reactor subsets in the reactor array.

In a preferred embodiment, the heater unit also comprises an insulating plate 56 to reduce downward heat loss from heater 40. Thus, insulating plate 56 is preferably positioned such that upper surface 58 of insulating plate 56 is adjacent to lower surface 44 of heater 40. Insulating plate 56 can be made of a layer of material such as MACOR® material (Corning Glass Works, Corning, N.Y.) or other materials resistant to heat transfer.

Preferably, heating unit 6 also includes a base plate 64. In a preferred embodiment, upper surface 66 of base plate 64 is positioned adjacent to lower surface 60 of insulating plate 56. In a preferred embodiment, base plate 64 comprises locator pins 70 and 72 which are used to align reaction substrate 4 and heating unit 6. Base plate pins 70 preferably are flush with upper surface 8 of heating unit 6. In a preferred embodiment, base plate pins 72 preferably extend above upper surface 8 of heating unit to prevent reaction substrate 4 from sliding laterally in at least one direction. Base plate 64 is preferably made of aluminum or a similar material which dissipates heat generated from heater 40.

Figure 3:
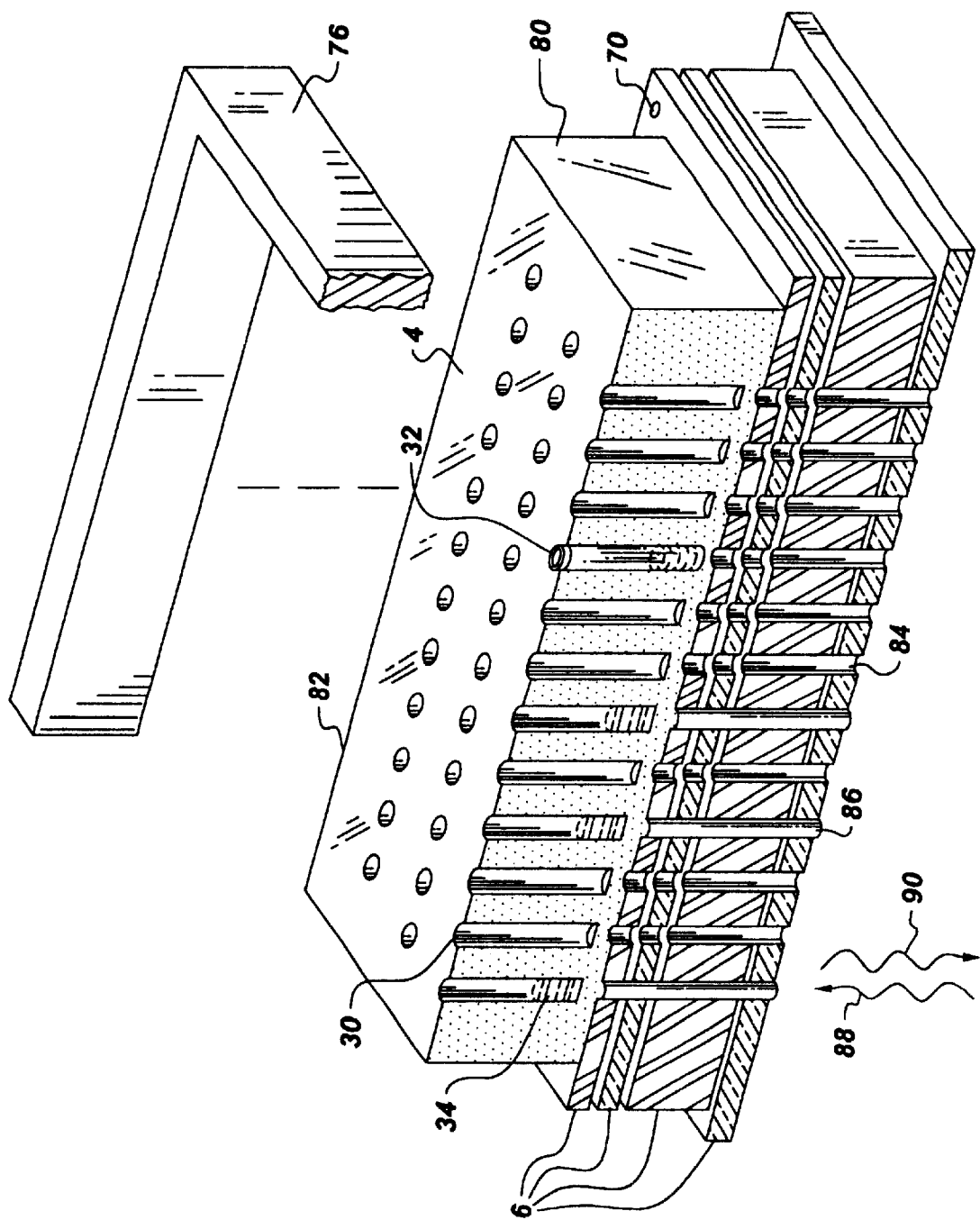
FIG. 3 is a prospective view of an aspect of an alternate embodiment of the present invention.

In one embodiment, L-shaped insulating walls 76 are wrapped around reaction substrate 4 to prevent heat loss from the sides 80 and 82 of substrate reservoir 30. Insulating arms may be made of materials such as RESCOR® 360 ceramic board (Cotronics Corp., Brooklyn N.Y.) or any other rigid or semi rigid insulating material, attached to aluminum supports (FIG. 3). Additionally, an external heat source 78 such as a blower, preferably heats manifold 12 to substantially prevent condensation of gas 36 or volatile byproducts, such as phenol, that are present in atmosphere above substrate reservoir 30 (FIG. 1).

It will be understood that individual components of heating unit 6 may be assembled as one unit, or be fashioned separately, depending on the needs of the operator. By having heating unit 6 comprised of a base plate 64, insulating plate 56, heater 40 and heat distribution plate 48 preassembled as one unit, assembling the apparatus is simplified. However, by keeping components of heating unit 6 as individual units, the apparatus can be optimized for each experiment. For example, it is contemplated that in a preferred embodiment, heater 40 can be optimized to have power-to-mass ratio suitable for the individual reaction being studied.

Thus, the modular design of the reactor assembly provides flexibility for reactor conversion. As described above, individual components can be optimized for the chemistry of a specific polymerization. In addition, the reactor assembly can be modified to enable monitoring product formation or substrate utilization during the course of the reaction.

FIG. 3 shows an embodiment of the invention for conducting real-time monitoring of a high-throughput chemical screening experiment during the course of the reaction. In the embodiment shown, reaction substrate 4 is positioned adjacent to a heating unit 6 comprising apertures 84 aligned with substrate reservoirs 30 or reaction tubes 32. Thus, in the embodiment shown, reaction substrate 4 is a block having a plurality of discrete wells 30 adapted to receive reactants 34. In another embodiment of the invention, individual tubes 32 may be inserted into substrate reservoir 30. Preferably, substrate reservoir 30 or reaction tubes 32 are made of borosilicate glass, fused quartz or other materials which are stable to the chemistry of the reaction and enable visualization of product by spectrophotometric methods. Preferably, heating unit 6 is constructed with apertures 84 small enough not to produce noticeable disturbance of heat distribution on individual substrate wells 30 or tubes 32.

In an alternate embodiment of the invention, apertures 84 comprise a filtering element 86. Preferably, filtering element 86 comprises a lens. For example, a GRIN type lens, or other similar lenses with have the ability to focus white light as well as fluorescent radiation, may be employed. Although not required, the lens serves as a waveguide to bring optical energy 88 through the relatively small apertures 84.

Figure 4:
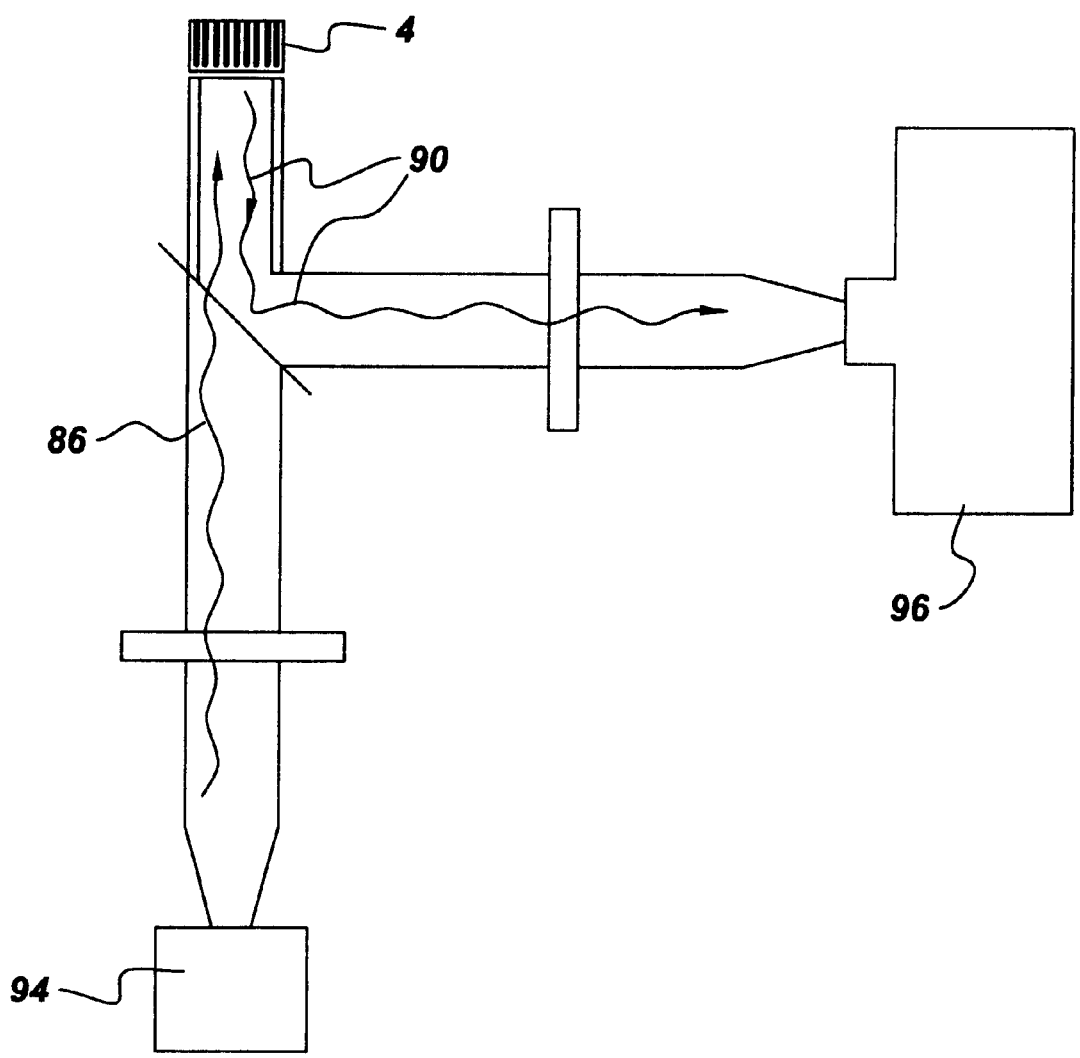
FIG. 4 is a schematic representation of an aspect of an alternate embodiment of the present invention.

Referring now to FIG. 4, for real time monitoring, one embodiment of the invention comprises a radiation source 94 and a detector 96. Thus, in one embodiment, incident radiation 88, as for example white or monochromatic light, can be directed to reaction substrate 4. It is contemplated that incident radiation 88 can be directed to individual substrate reservoirs 30 or simultaneously to all substrate reservoirs 30 in reaction substrate 4. Preferably, said incident radiation 88 is directed to substrate reservoirs 30 through a glass plate 26 on gas manifold 12 (FIG. 2). In an alternative embodiment, incident radiation 88 is directed to substrate reservoir 30 through apertures 84 in heating unit 6 (FIG. 3). In another embodiment shown in FIG. 5, input radiation is directed to substrate reservoirs 30 through lenses 86 in apertures 84 in heating unit 6.

Preferably, radiation emitted 90 from substrate reservoir 30 is detected visually (FIG. 2). Even more preferably, emitted radiation 90 is directed to a detector 96 (FIG. 4). In one embodiment, detector 96 is a digital camera. In an alternative embodiment, detector 96 is a fluorimeter. In an alternate embodiment, emitted radiation is directed through lenses 86 in apertures 84 prior to detection by detector 96.

The present invention also provides methods for performing multiple chemical reactions. The methods of the present invention may be performed in an apparatus of the present invention or in other suitable equipment. In one embodiment the method may include the steps of adding reagents to a reaction substrate comprising at least one substrate reservoir; assembling a heating unit; positioning the reaction substrate adjacent to the heating unit; covering the substrate reservoir with a manifold; providing a flow of gas in the manifold; heating the heating unit to at least one predetermined temperature; cooling the substrate reservoir; and monitoring the formation of reaction products.

Alternatively, methods of the present invention include monitoring the reaction during the course of the reaction. Such real time monitoring may include, but is not limited to, monitoring fluorescence characteristic of reaction products.

Figure 6:
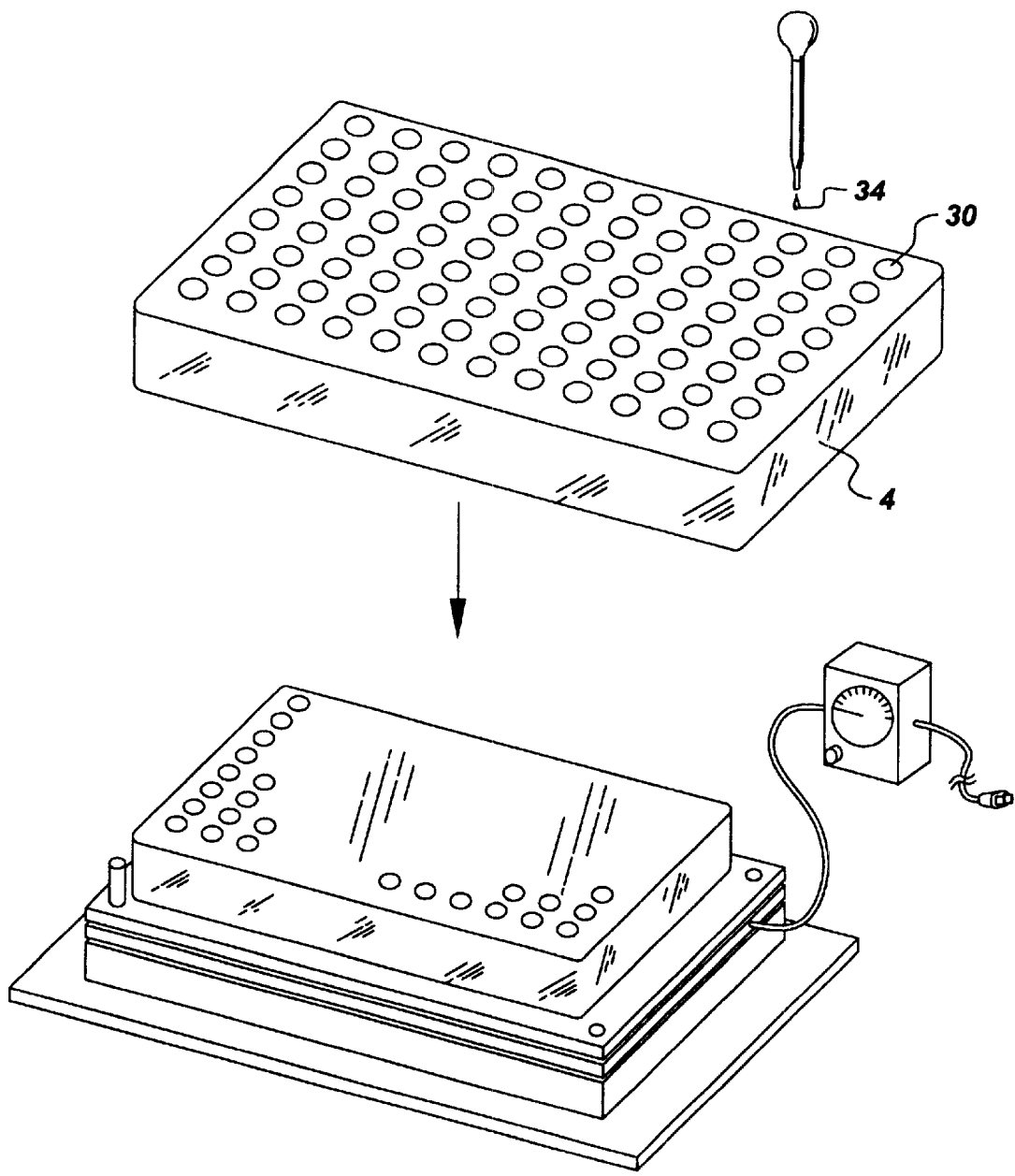
FIG. 6 is a schematic representation of an aspect of a multi-well polymerization reactor array of the present invention.
Figure 7:
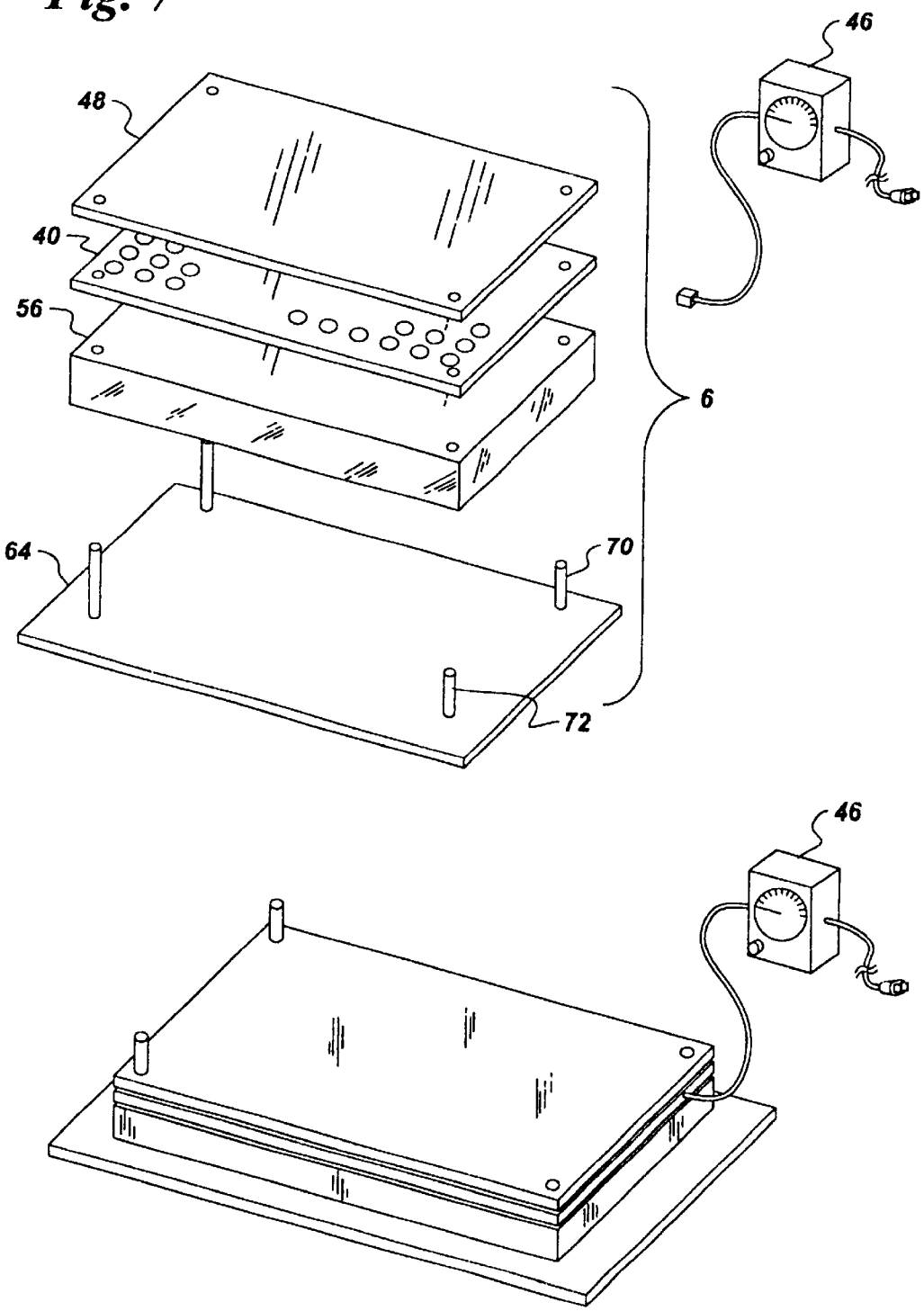
FIG. 7 is a schematic representation of an aspect of a multi-well polymerization reactor array of the present invention.

Thus, in one aspect and referring now to FIG. 6, starting reactants 34 are placed into or prepared in substrate reservoir wells 30 in reaction substrate 4 and heating unit 6 assembled, as illustrated in FIG. 7. Reaction components may be evaporated to a thin film, thereby promoting mass transfer between liquid and gas phases in substrate reservoir 30. Reaction substrate 4 is then positioned on heating unit 6 and gas manifold 12 assembled. Preferably, a deadweight 28 (not shown) is placed on top of gas manifold 12.

In one embodiment of the invention, heating unit 6 comprises heater 40 with high power-to-mass ratio. In a preferred embodiment, a multiple setpoint controller 46 is used to adjust the temperature of heater 40. For example, in one embodiment, heater 40 is ramped to various temperatures over the course of the reaction. Preferably, heating unit 6 also comprises an insulation plate 56. More preferably, heating unit 6 comprises a heat distribution plate 48. Even more preferably, heating unit 6 comprises a base plate 64. Most preferably, base plate includes pins 70 and 72 to align heating unit 6 with reaction substrate 4. It will be understood that heating unit 6 may be preassembled as a separate unit. Alternatively, it may be preferable to keep components of heating unit 6 separate, so that individual components may be optimized for specific reaction conditions.

Figure 8:
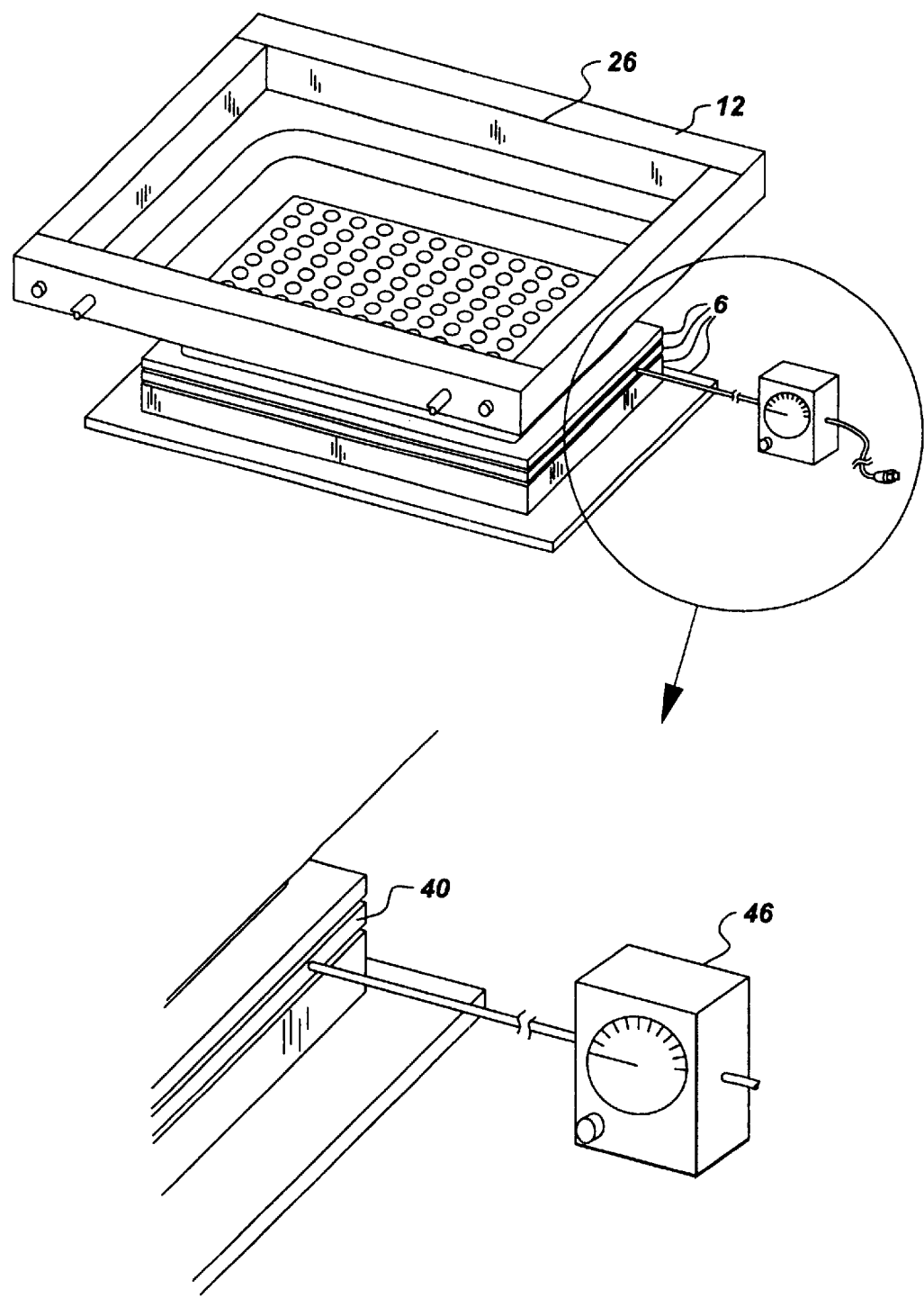
FIG. 8 is a schematic representation of an aspect of a multi-well polymerization reactor array of the present invention.
Figure 9:
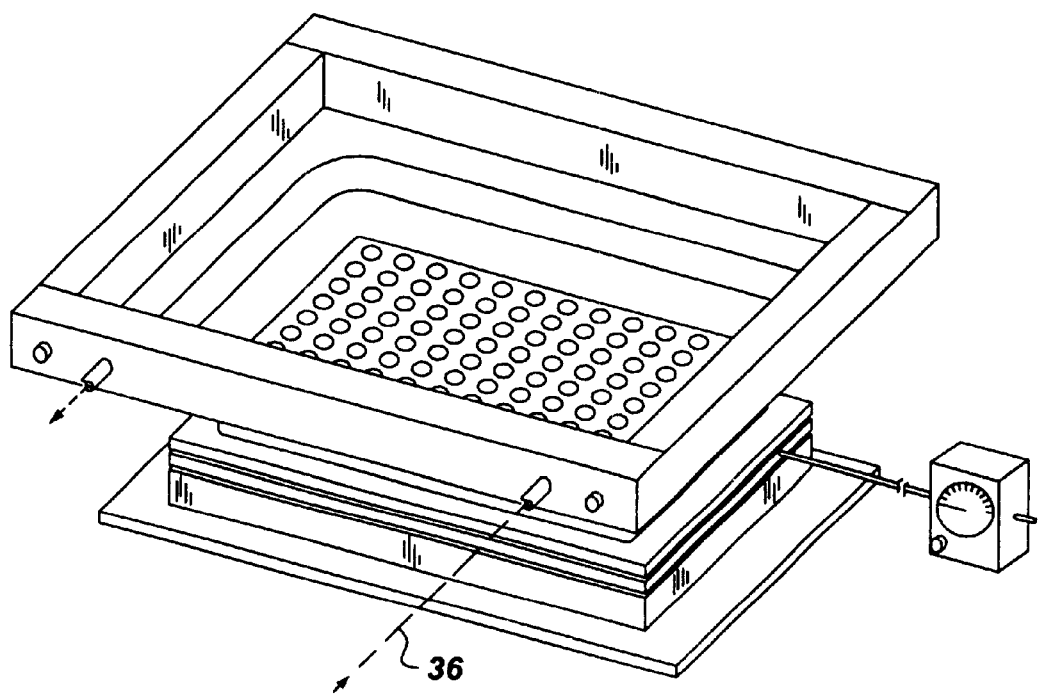
FIG. 9 is a schematic representation of an aspect of a multi-well polymerization reactor array of the present invention.

Referring to FIGS. 8 and 9, once the reaction block 2 has been assembled, a flow of inert gas 36 is introduced into gas manifold 12. Preferably, the gas used is nitrogen or any other gas inert to reaction components. Even more preferably, gas flow 36 (FIG. 9) promotes volatilization of inhibitory by-products, such as phenol, formed during the reaction. Heater 40 is actuated by multiple setpoint controller 46 to ramp to, and hold, the reaction substrate 4 at various desired temperature setpoints.

Figure 10:
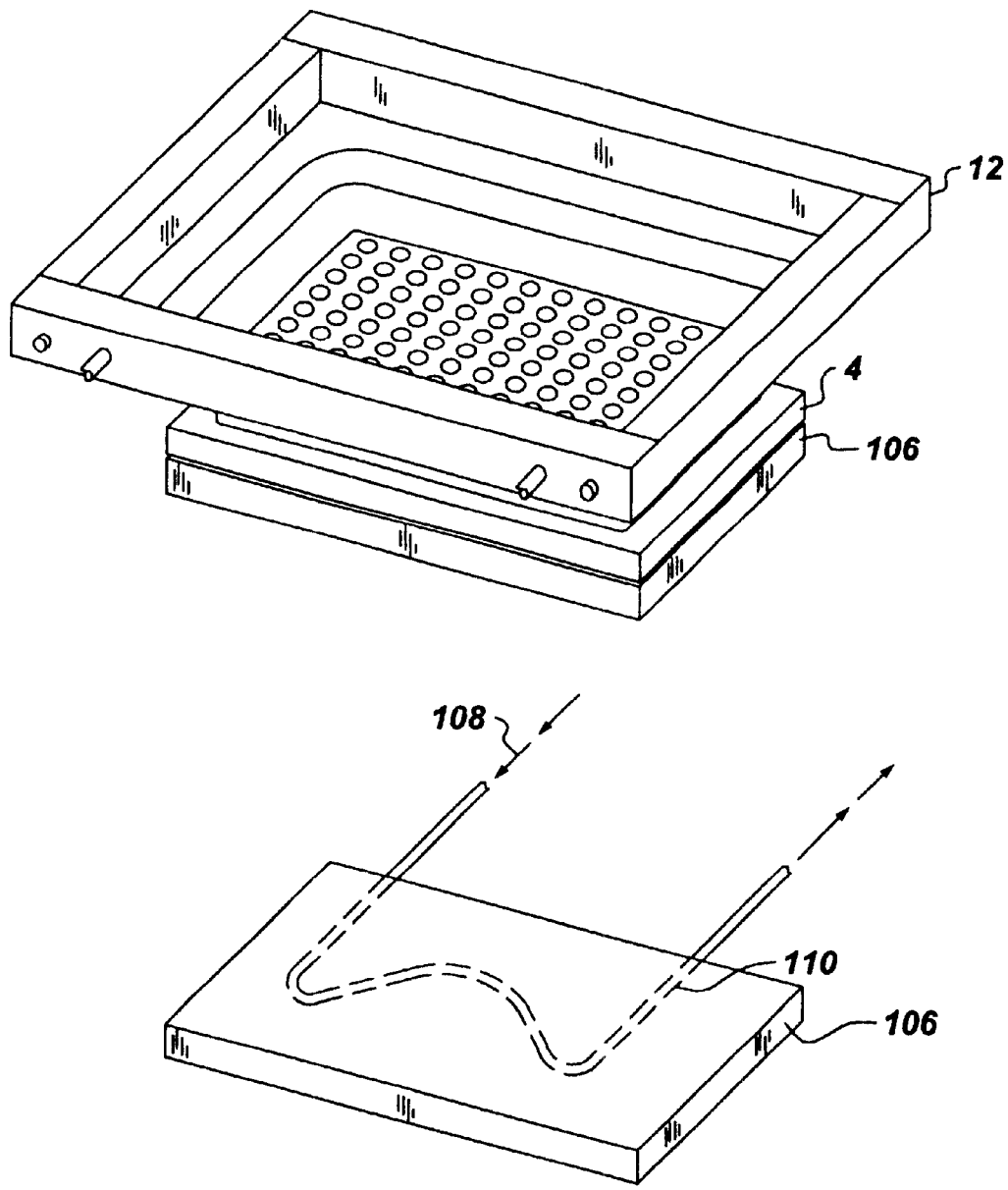
FIG. 10 is a schematic representation of an aspect of a multi-well polymerization reactor array of the present invention.

Referring to FIG. 10, to stop the reaction, substrate reservoir 30 can be rapidly cooled below the range of reaction temperatures. Thus, in one embodiment of the method, the reaction is stopped by removing deadweight 28 (not shown) from gas manifold 12 and laterally pushing a subset of reactor components including reaction substrate 4 and gas manifold 12 onto a cooling block 106. Preferably, cooling block 106 is made of a material which is thermally conductive such as copper, aluminum, or the like. Heat removal from the reactor assembly can preferably be facilitated by passing a cooling agent 108 such as water through channels 110 in the cooling block. In this manner the reaction temperature is rapidly reduced to stop the reaction at the desired time-point.

Figure 11:
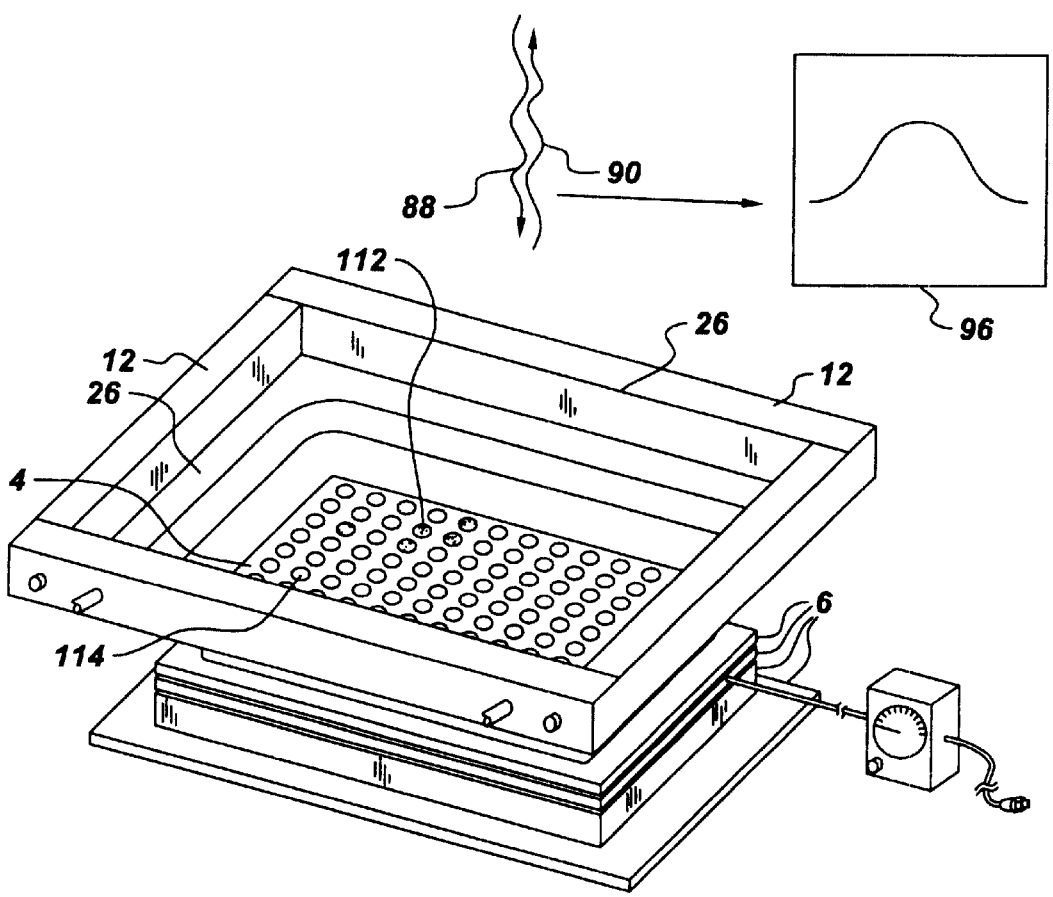
FIG. 11 is a schematic representation of an aspect of a multi-well polymerization reactor array of the present invention.
Figure 12:
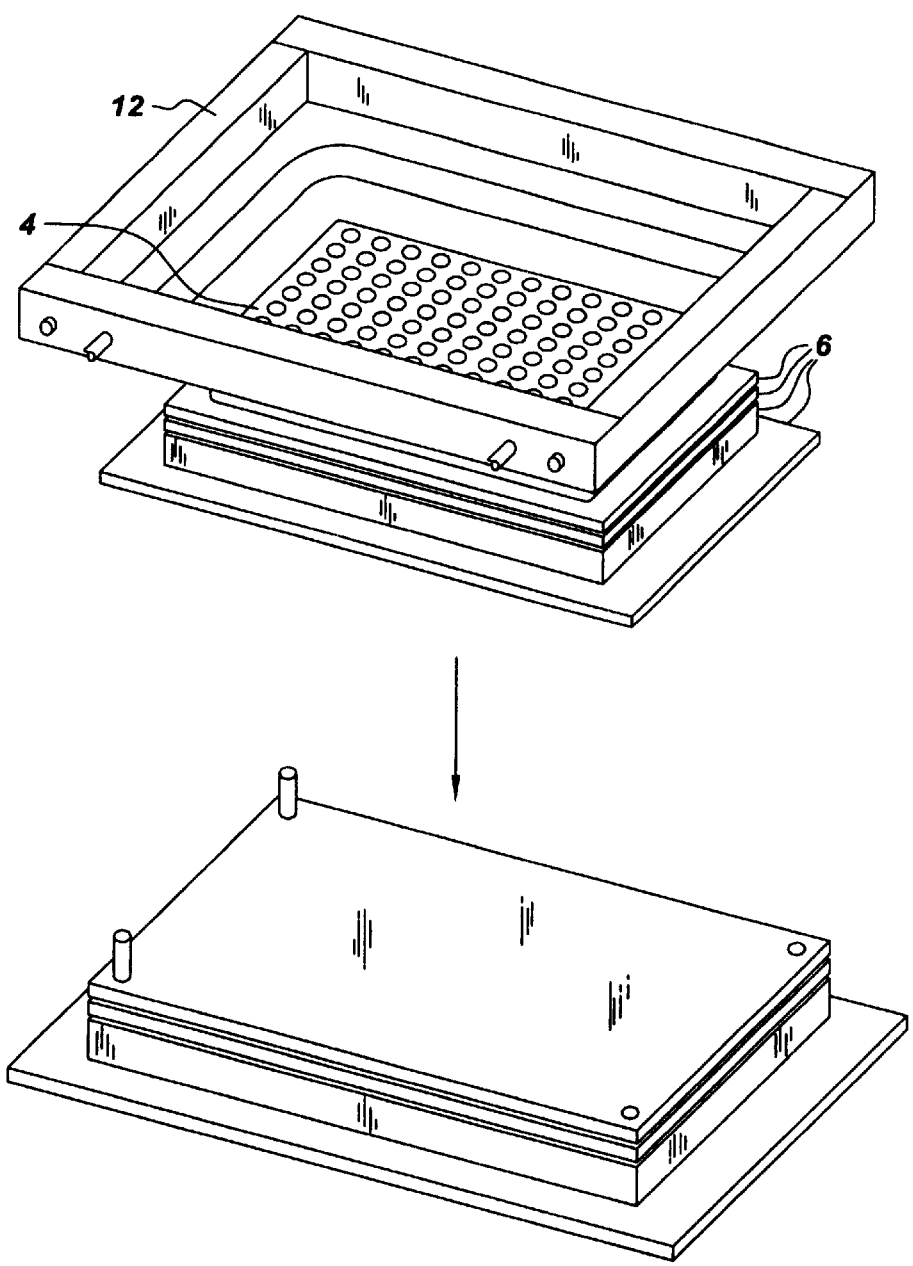
FIG. 12 is a schematic representation of an aspect of a multi-well polymerization reactor array of the present invention.

Referring to FIG. 11, in an alternate embodiment of the invention, fluorescence imaging spectroscopy is used to monitor the reaction during the time course of the reaction. Fluorescence imaging spectroscopy is an attractive method for monitoring reactions in highly dense arrays of polymerization reactors because it can be used for simultaneous measurements from multiple substrate wells. In addition, fluorescence imaging allows for measurement of reaction progress without termination of the reaction (i.e. "real-time" monitoring of the reaction). Using this technique, an increase in fluorescence emission of the bands corresponding to reaction products can be monitored. For example, in a preferred embodiment, emission at 440–550 nm is monitored to quantitate the amount of Fries rearrangement products.

As an example of an embodiment of the invention enabling real time monitoring of a reaction, an imaging setup based on a multi-well polymerization reactor array is illustrated in FIGS. 6–12. Thus, in one embodiment, starting reaction components 34 are placed into or prepared in substrate reservoir 30 and heating unit 6 and manifold 12 assembled. A flow of nitrogen, or other inert gas 36, is introduced into gas manifold 12 and heater 40 is actuated to ramp to, and hold, the reaction substrate 4 at various desired temperature setpoints. At various time points during the course of the reaction, incident radiation 88 is directed to substrate reservoir wells 30 and emitted radiation 90 is measured. In one embodiment of the invention, emitted radiation 90 is directed to imaging detector 96 for recording of data.

Thus, in the embodiment of the invention shown in FIGS. 6–12, input radiation 88 is directed to substrate reservoir wells 30 through glass plate 26 on gas manifold 12. Radiation subsequently emitted 90 is then monitored. Preferably, emitted radiation 90 is monitored visually as either a positive signal 112 or a negative signal 114. More preferably, emitted radiation 90 is monitored with a detector 96 (FIG. 4). Detector 96 can be a digital camera or similar device for recording emitted radiation. Alternatively, imaging detector 96 can be a fluorimeter for quantitation of emitted radiation.

Figure 5:
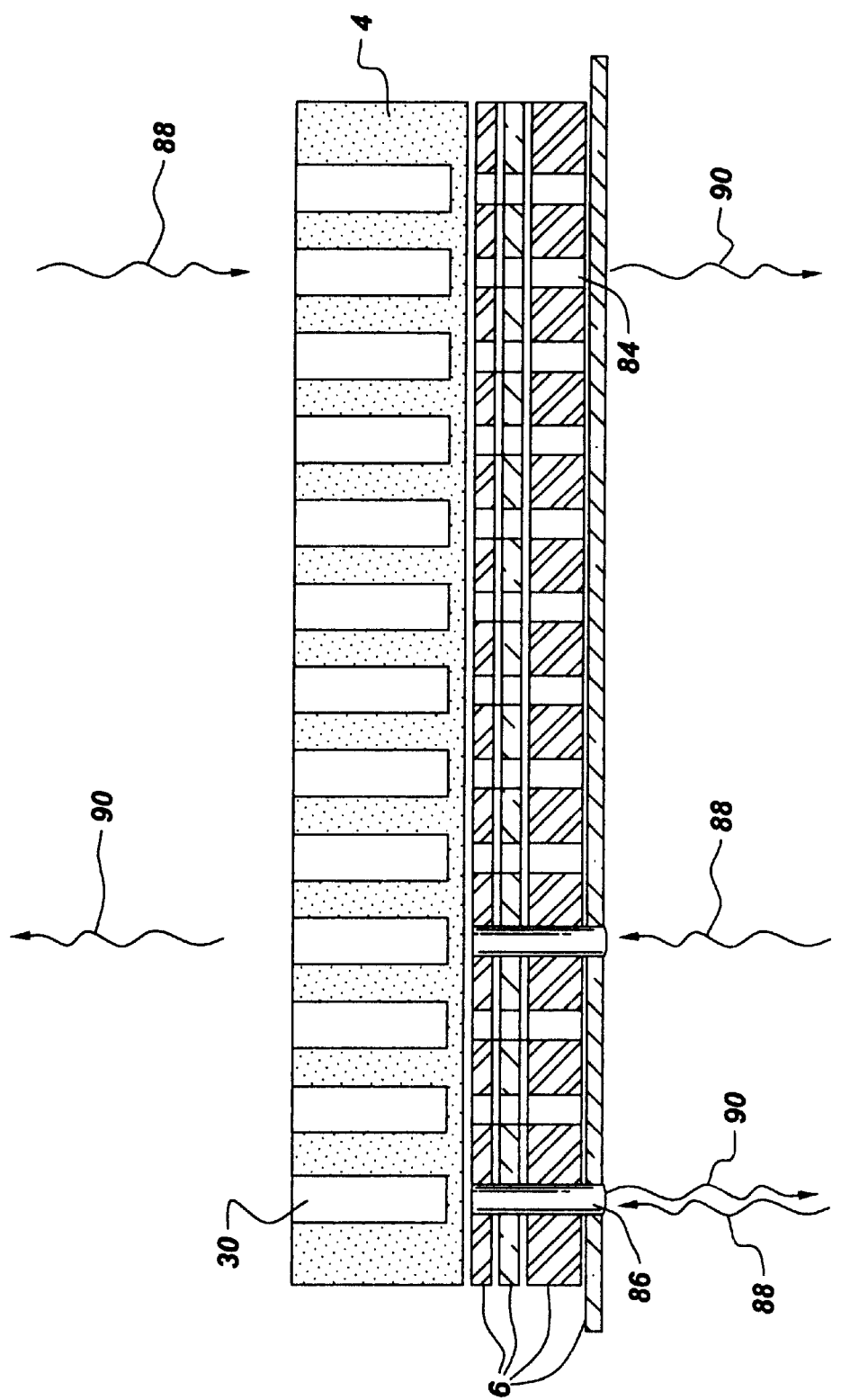
FIG. 5 is a side view of an aspect of an alternate embodiment of the present invention.

Referring now to FIG. 5, in an alternate embodiment of the invention, input radiation 88 is directed to substrate reservoir wells 30 through apertures 84 in heating unit 6. In one embodiment, emitted radiation 90 is detected from above, through glass plate 26 on manifold 12. In an alternate embodiment, emitted radiation 90 is detected below, from apertures 84 (FIG. 5).

In another embodiment of the invention, a lens 86 is positioned in apertures 84 aligned with substrate reservoir wells 30 on reaction substrate 4. It is contemplated that GRIN type lenses, or other similar lenses which have the ability to focus radiation can be employed. Thus, in a preferred embodiment of the invention, incident radiation 88 is directed to substrate reservoir wells 30 through lenses 86 in apertures 84 in heating unit 6. Emitted radiation 90 can be detected through glass plate 26 either visually or by detector 96. In an alternate embodiment, emitted light 90 is detected through lenses 86.

In various embodiments, the method and apparatus of the present invention may provide one or more of the following advantages over conventional screening techniques:

1. High surface-to-volume ratio of reactors in an array results in a thin-film polymerization capability. This approach can significantly reduce the scale of the polymerization reactions, which may eliminate the problems of multiplexing of individual reactors and permit an arrangement of multiple reactors in a compact format as an array having, for example, about a hundred or more individual reactors;
2. The high power-to-mass ratio of a heater for the reactor array allows for rapid heating to a desired temperature, which can be beneficial in polymerization reactions. Reactor design permits operation at high temperatures;

3. Potentially inhibitory reaction byproducts (e.g., phenol) are rapidly removed from the reactor headspace with a flow of an inert gas through the headspace;
4. Design of the reactor array can allow for real-time monitoring of the reaction progress to increase the throughput of catalyst screening;
5. Modular design of the reactor assembly can provide the flexibility for reactor conversion for different polymerization reactions and real-time monitoring applications; and
6. The reactor array block can be rapidly cooled in order to stop the reaction as desired.

The following examples are provided in order that those skilled in the art will be better able to understand and practice the present invention. These examples are intended to serve as illustrations and not as limitations of the present invention as defined in the claims herein.

EXAMPLE 1

Table 1 shows data illustrating the temperature uniformity of the reaction substrate in one embodiment of the invention. In the embodiment utilized, a microtiter plate was used as the reaction substrate. It can be seen that there is a high level of uniformity of temperature, and that variations in temperature are relatively independent of the positioning of the individual wells. Tabulated results are for a 96-well orthogonal plate (8×12 array) with well locations designated by columns (A through L) and rows (1 through 8). Wells chosen for analysis are randomly distributed to provide a representative profile of temperature uniformity across the plate. Nitrogen gas entered the manifold above the wells, perpendicular to column A (flowing in the direction from column A to column L) at a flow rate of 8 standard liters per minute. The relative standard deviation is a measure of overall temperature uniformity at a given time (temperature setting), and is typically less than 2% after the initial temperature ramp to 180 degrees Celsius.

TABLE 1

| Time | Temperature at designated well location (degrees Celsius) | | | | | | | | Relative Standard Deviation |
|---|---|---|---|---|---|---|---|---|---|
| (seconds) | G7 | L7 | J5 | K1 | F2 | B8 | A2 | C4 | (%) |
| 60 | 28.23 | 29.11 | 27.42 | 28.84 | 28.14 | 28.90 | 26.62 | 26.37 | 3.75 |
| 120 | 29.75 | 30.30 | 29.26 | 30.10 | 29.70 | 30.10 | 28.67 | 28.70 | 2.14 |
| 180 | 34.54 | 35.11 | 33.25 | 34.04 | 34.31 | 34.80 | 31.53 | 32.17 | 3.82 |
| 240 | 49.46 | 51.21 | 47.06 | 49.17 | 49.37 | 50.57 | 43.50 | 44.72 | 5.77 |
| 300 | 57.14 | 58.73 | 55.30 | 56.80 | 57.42 | 58.08 | 52.01 | 53.68 | 4.11 |
| 360 | 68.83 | 70.69 | 66.53 | 67.96 | 69.09 | 69.91 | 62.12 | 64.71 | 4.27 |
| 420 | 78.31 | 80.19 | 76.34 | 77.32 | 78.86 | 79.38 | 71.80 | 75.04 | 3.54 |
| 480 | 88.48 | 90.41 | 86.40 | 87.02 | 89.12 | 89.48 | 81.19 | 85.31 | 3.39 |
| 540 | 98.63 | 100.71 | 96.68 | 97.05 | 99.48 | 99.63 | 91.04 | 95.87 | 3.13 |
| 600 | 108.58 | 110.59 | 106.63 | 106.63 | 109.53 | 109.35 | 100.42 | 106.02 | 2.98 |
| 660 | 118.90 | 121.03 | 117.06 | 116.80 | 120.12 | 119.56 | 110.33 | 116.49 | 2.85 |
| 720 | 129.05 | 131.19 | 127.27 | 126.68 | 130.31 | 129.51 | 120.04 | 126.89 | 2.72 |
| 780 | 139.38 | 141.63 | 137.72 | 136.86 | 140.58 | 139.64 | 129.97 | 137.50 | 2.61 |
| 840 | 149.14 | 151.21 | 147.59 | 146.31 | 150.28 | 149.09 | 139.42 | 147.39 | 2.48 |
| 900 | 159.52 | 161.55 | 157.99 | 156.41 | 160.69 | 159.19 | 149.25 | 157.72 | 2.42 |
| 960 | 169.75 | 171.76 | 168.28 | 166.38 | 171.05 | 169.15 | 159.08 | 167.94 | 2.36 |
| 1020 | 180.00 | 181.87 | 178.60 | 176.39 | 181.28 | 179.11 | 168.83 | 178.22 | 2.31 |
| 1080 | 186.55 | 188.60 | 186.13 | 183.79 | 188.35 | 185.89 | 176.97 | 186.19 | 1.99 |
| 1140 | 181.81 | 183.77 | 183.01 | 179.82 | 184.58 | 181.30 | 176.25 | 184.69 | 1.56 |
| 1199 | 180.49 | 182.18 | 181.40 | 178.03 | 182.82 | 179.74 | 174.59 | 182.86 | 1.57 |
| 1259 | 182.17 | 184.22 | 182.94 | 180.21 | 184.39 | 181.64 | 176.16 | 184.17 | 1.52 |
| 1319 | 180.67 | 182.88 | 181.84 | 179.27 | 183.15 | 180.21 | 175.81 | 183.13 | 1.38 |
| 1379 | 181.42 | 183.75 | 182.35 | 180.04 | 183.70 | 181.03 | 176.31 | 183.53 | 1.38 |
| 1439 | 181.04 | 183.60 | 182.21 | 180.04 | 183.53 | 180.76 | 176.60 | 183.34 | 1.31 |
| 1499 | 181.03 | 183.60 | 182.11 | 180.01 | 183.45 | 180.84 | 176.68 | 183.22 | 1.28 |
| 1559 | 181.10 | 183.84 | 182.17 | 180.33 | 183.54 | 181.02 | 176.94 | 183.33 | 1.25 |
| 1619 | 180.99 | 183.73 | 182.07 | 180.24 | 183.35 | 180.85 | 177.05 | 183.07 | 1.20 |
| 1679 | 180.92 | 183.79 | 181.99 | 180.33 | 183.36 | 180.93 | 177.14 | 183.04 | 1.18 |
| 1739 | 180.81 | 183.73 | 181.94 | 180.38 | 183.25 | 180.98 | 177.23 | 183.03 | 1.16 |
| 1799 | 180.78 | 183.66 | 181.88 | 180.27 | 183.14 | 180.84 | 177.20 | 182.78 | 1.14 |
| 1859 | 180.78 | 183.76 | 181.90 | 180.42 | 183.30 | 180.93 | 177.42 | 182.80 | 1.12 |
| 1919 | 180.78 | 183.73 | 181.79 | 180.36 | 183.12 | 180.91 | 177.37 | 182.72 | 1.11 |
| 1979 | 180.98 | 183.91 | 182.00 | 180.63 | 183.33 | 181.18 | 177.68 | 182.92 | 1.08 |
| 2039 | 180.61 | 183.61 | 181.69 | 180.29 | 183.02 | 180.83 | 177.47 | 182.61 | 1.07 |
| 2099 | 180.83 | 183.91 | 181.85 | 180.62 | 183.25 | 181.14 | 177.66 | 182.69 | 1.07 |
| 2159 | 180.81 | 183.92 | 181.91 | 180.70 | 183.27 | 181.12 | 177.77 | 182.68 | 1.06 |
| 2219 | 180.54 | 183.68 | 181.64 | 180.47 | 182.98 | 180.93 | 177.63 | 182.59 | 1.05 |
| 2279 | 184.44 | 187.05 | 184.33 | 183.27 | 186.23 | 184.37 | 179.31 | 184.61 | 1.25 |
| 2339 | 200.42 | 203.36 | 198.63 | 198.37 | 201.65 | 200.22 | 190.90 | 197.41 | 1.88 |
| 2399 | 209.36 | 212.26 | 208.18 | 207.72 | 211.04 | 209.16 | 200.61 | 207.26 | 1.68 |
| 2459 | 220.17 | 222.38 | 218.37 | 217.33 | 221.45 | 219.25 | 209.60 | 217.13 | 1.81 |
| 2519 | 231.09 | 233.08 | 229.34 | 227.94 | 232.54 | 229.92 | 219.95 | 227.91 | 1.80 |
| 2579 | 240.96 | 242.30 | 238.90 | 236.97 | 242.17 | 239.15 | 229.04 | 237.56 | 1.79 |
| 2639 | 248.74 | 250.35 | 247.35 | 245.40 | 250.38 | 246.89 | 237.59 | 246.13 | 1.65 |
| 2699 | 243.59 | 245.67 | 244.20 | 241.77 | 246.26 | 242.43 | 237.03 | 244.50 | 1.19 |
| 2759 | 242.80 | 244.39 | 242.83 | 240.12 | 244.90 | 241.16 | 235.32 | 242.85 | 1.26 |
| 2819 | 244.62 | 246.48 | 244.50 | 242.36 | 246.66 | 243.06 | 237.08 | 244.30 | 1.24 |
| 2879 | 243.23 | 245.41 | 243.50 | 241.44 | 245.47 | 241.98 | 236.72 | 243.53 | 1.15 |
| 2939 | 243.89 | 245.98 | 243.85 | 241.92 | 246.09 | 242.50 | 237.04 | 243.67 | 1.18 |
| 2999 | 243.59 | 245.90 | 243.72 | 242.09 | 245.80 | 242.37 | 237.22 | 243.51 | 1.12 |

TABLE 1-continued

| Time | Temperature at designated well location (degrees Celsius) | | | | | | | | Relative Standard Deviation |
|---|---|---|---|---|---|---|---|---|---|
| (seconds) | G7 | L7 | J5 | K1 | F2 | B8 | A2 | C4 | (%) |
| 3059 | 243.71 | 245.99 | 243.61 | 242.14 | 245.88 | 242.39 | 237.33 | 243.45 | 1.12 |
| 3119 | 243.67 | 246.12 | 243.64 | 242.33 | 245.92 | 242.40 | 237.44 | 243.41 | 1.11 |
| 3179 | 243.83 | 246.20 | 243.77 | 242.45 | 246.07 | 242.66 | 237.69 | 243.58 | 1.09 |
| 3239 | 243.65 | 246.18 | 243.65 | 242.37 | 245.94 | 242.52 | 237.73 | 243.45 | 1.08 |

EXAMPLE 2

Shown in Tables 2 and 3 are data illustrating temperature reproducibility from experiment to experiment in substrate reservoirs of one embodiment of the invention. Tabulated results are for 96-well orthogonal plates (8×12 array) with well locations designated by columns (A through L) and rows (1 through 8). The wells chosen for analysis are randomly distributed to provide a representative profile across the plate. Nitrogen gas entered the manifold above the wells, perpendicular to column A (flowing in the direction from column A to column L) at a flow rate of 8 standard liters per minute. Table 2 summarizes the average temperature of 8 wells in a 96-well plate at three different temperature set-points and for each of three experiments. Table 3 summarizes temperature uniformity per well (individual wells are identified by column and row) as a function of time and temperature setpoint for each of three separate experiments (runs 1, 2 and 3).

TABLE 2

| | Run-to-Run Variability | | | |
|---|---|---|---|---|
| | Run 1 | Run 2 | Run 3 | % Relative Standard Deviation |
| Average temperature during soak 1 | 181.46 | 182.95 | 183.00 | 0.479 |
| Average temperature during soak 2 | 243.23 | 244.60 | 244.53 | 0.315 |
| Average temperature during soak 3 | 285.33 | 285.09 | 285.05 | 0.054 |

TABLE 3

| | | Duration | Relative Standard Deviation of Temperature (%) | | | | | | | | |
|---|---|---|---|---|---|---|---|---|---|---|---|
| | Description | (minutes) | Total | G7 | L7 | J5 | K1 | K2 | B8 | A2 | C4 |
| | | | Run 1 | | | | | | | | |
| Soak 1 | Hold at 180 | 19.23 | 1.246 | 0.471 | 0.429 | 0.395 | 0.438 | 0.453 | 0.436 | 0.450 | 0.403 |
| Soak 2 | Hold at 240 | 17.50 | 1.120 | 0.331 | 0.342 | 0.282 | 0.350 | 0.319 | 0.330 | 0.305 | 0.259 |
| Soak 3 | Hold at 285 | 9.50 | 1.168 | 0.378 | 0.380 | 0.311 | 0.364 | 0.399 | 0.388 | 0.249 | 0.292 |
| | | | Run 2 | | | | | | | | |
| Soak 1 | Hold at 180 | 19.25 | 1.407 | 0.602 | 0.535 | 0.511 | 0.506 | 0.596 | 0.514 | 0.476 | 0.510 |
| Soak 2 | Hold at 240 | 19.23 | 1.234 | 0.401 | 0.372 | 0.339 | 0.358 | 0.383 | 0.367 | 0.303 | 0.309 |
| Soak 3 | Hold at 285 | 9.25 | 1.294 | 0.385 | 0.393 | 0.316 | 0.379 | 0.407 | 0.380 | 0.287 | 0.244 |
| | | | Run 3 | | | | | | | | |
| Soak 1 | Hold at 180 | 19.00 | 1.286 | 0.536 | 0.474 | 0.466 | 0.474 | 0.580 | 0.487 | 0.405 | 0.514 |
| Soak 2 | Hold at 240 | 19.23 | 1.209 | 0.295 | 0.284 | 0.250 | 0.293 | 0.321 | 0.291 | 0.262 | 0.266 |
| Soak 3 | Hold at 285 | 19.25 | 1.256 | 0.278 | 0.307 | 0.223 | 0.324 | 0.288 | 0.275 | 0.283 | 0.182 |

EXAMPLE 3

One embodiment of the apparatus and method of the invention is described below. In this embodiment, the heating unit consisted of a thin foil heating element ($1/32$ inch×$3/8$ inch×5.5 inch) which has a power rating of 500 Watts (110 VAC current). The heating unit also included a stainless steel base plate ($3/16$ inch×6 inch×8 inch) with two short locator pins each ½ inch in length, and two longer locator pins ¾ inch in length, for aligning various components of the heating unit. Also included as part of the heating unit is an insulating plate (0.5 inch×3.9 inch×5.5 inch) which was formed of MACOR® Rencor 914 ceramic (Corning Glass Works, Corning, N.Y.) and a copper heat distribution plate ($1/8$ inch×3.9 inch×$5/6$ inch). The reactor utilized a standard borosilicate glass 96-well (3.5 inch×5 inch) microtiter plate (Spike International Ltd., Wilimington, N.C.) as the reaction substrate. The microtiter plate was organized as an 8×12 array with well locations designated by columns (A through L) and rows (1 through 8). A 316 stainless steel frame nitrogen manifold with exterior dimensions of about 1 inch×4.6 inch×6.25 inch and interior dimensions of about 2.9×4.32 inch was placed on top of the microtiter plate. A glass plate (1/16 "×3.5"×5") was included as the top surface of the manifold. Also included as part of the manifold was a gasket made of GARLOCK GASKET™ and ports for gas to enter and exit the manifold. Insulating arms (0.9 inch× 4.12 inch by 0.9 inch×5.78 inch) were wrapped around the microtiter plate to reduce heat loss from outer wells. Finally, a brass deadweight frame 1.5 inch thick with interior dimensions of about 4.35 inch×6 inch and exterior dimensions of about 7.35 inch×9 inch was placed on top of the manifold. The brass deadweight was sized so that it did not overlap the manifold window. In this way, the reaction was monitored by looking through the manifold window.

In a typical run, 100 µL of reactants were loaded into reaction wells and evaporated to a volume of less than 25 µL. After assembly of the reactor, the thin foil heater was ramped to 180 degrees Celsius, and the temperature then incrementally increased depending on the polymerization of interest. Nitrogen gas entered the manifold above the wells, perpendicular to column A and was directed to flow in the direction from column A to column L at a flow rate of 8 standard liters per minute. After approximately 2 hours at the reaction temperature, the microtiter plate and manifold were transferred to a copper cooling plate to stop the reaction. A nitrogen laser was then used to direct white or monochromatic light to the microtiter plate for fluorescent visualization of reaction products.

It will be understood that each of the elements described above, or two or more together, may also find utility in applications differing from the types described herein. While the invention has been illustrated and described as embodied in a method and apparatus for high-throughput chemical screening, it is not intended to be limited to the details shown, since various modifications and substitutions can be made without departing in any way from the spirit of the present invention. For example, robotic equipment can be used to prepare the samples and various types of parallel analytical screening methods can be incorporated. As such, further modifications and equivalents of the invention herein disclosed may occur to persons skilled in the art using no more than routine experimentation, and all such modifications and equivalents are believed to be within the spirit and scope of the invention as defined by the following claims.

What is claimed is:

1. A modular apparatus for the rapid combinatorial screening of reactants and catalysts in thin film melt polymerization reactions, said apparatus comprising:
   a reaction substrate comprising at least one substrate reservoir;
   a heating unit in thermal communication with said reaction substrate;
   a heat distribution plate disposed between the heating unit and the reaction substrate;
   a cooling block in thermal communication with said reaction substrate;
   a heated gas manifold covering said reaction substrate;
   a gas source for delivering pre-heated gas to the heated gas manifold;
   a base plate comprising pins to align the reaction substrate, the heating unit, the heat distribution plate and the cooling block;
   a radiation source directed to the reaction substrate;
   a lens for focusing the radiation to the reaction substrate; and
   a radiation detector for monitoring fluorescence.

2. The apparatus of claim 1, further comprising a multiple setpoint controller for controlling the temperature of said heater.

3. The apparatus of claim 1, wherein said heating unit further comprises an insulating surface positioned on at least one side of said heating unit and not contiguous with said reaction substrate.

4. The apparatus of claim 1, wherein said manifold further comprises a glass window.

5. The apparatus of claim 1, wherein said radiation is directed through apertures in said heating unit, said apertures being aligned with said substrate reservoir.

6. The apparatus of claim 5, wherein at least one of said apertures comprises a lens.

7. The apparatus of claim 1, wherein insulating walls are positioned around sides of said reaction substrate.

8. The apparatus of claim 1, further comprising a reactant system applied as a thin layer within said substrate reservoir.

9. A method for the rapid combinatorial screening of reactants and catalysts in thin film melt polymerization reactions, comprising:
   adding at least one reactant system at least partially embodied in a liquid to a reaction substrate comprising at least one substrate reservoir;
   positioning a heating unit in thermal communication with at least one surface of the reaction substrate;
   covering the at least one substrate reservoir with a heated gas manifold;
   flowing a pre-heated gas into the manifold and over the substrate;
   promoting the volatalization of phenol by-products;
   heating the reaction substrate with the heating unit;
   cooling the reaction substrate with a cooling block for the purpose of stopping a reaction at a desired time point; and
   monitoring fluorescence characteristics of reaction products.

10. The method of claim 9, wherein said reactant system comprises a thin film.

11. The method of claim 9, wherein the monitoring step is performed during the reaction.

12. The method of claim 9, wherein a multiple setpoint controller is used to adjust the heater to at least one predetermined temperature.

13. The method of claim 9, wherein the heating unit further comprises an insulating plate positioned on at least one side of the heating unit removed from the reaction substrate.

14. The method of claim 9, wherein the heating unit further comprises a heat distribution plate in communication with the reaction substrate.

15. The method of claim 9, wherein the heating unit further comprises a base plate having pins adapted to align the heating unit with the reaction substrate.

16. The method of claim 9, further comprising the step of rapidly cooling the reaction substrate to stop the reaction prior to the monitoring step.

17. The method of claim 9, wherein said monitoring step comprises directing incident radiation to said at least one substrate reservoir and observing radiation emitted.

18. The method of claim 17, wherein the incident radiation is directed through a glass window on the manifold.

19. The method of claim 17, wherein the incident radiation is directed through apertures in the heating unit, said apertures being aligned with the substrate reservoirs in the reaction substrate.

20. The method of claim 19, wherein at least one of the apertures in the heating unit comprises a lens.

21. The method of claim 9, wherein the manifold is heated by an external heating source.

* * * * *